United States Patent
Liu et al.

(10) Patent No.: US 10,153,640 B2
(45) Date of Patent: Dec. 11, 2018

(54) UNIFIED POWER FLOW CONTROLLER AND CONTROL METHOD THEREOF

(71) Applicants: State Grid Jiangsu Electric Power Research Institute, Nanjing, Jiangsu (CN); State Grid Corporation of China, Beijing (CN)

(72) Inventors: Jiankun Liu, Jiangsu (CN); Ningyu Zhang, Jiangsu (CN); Qun Li, Jiangsu (CN); Jing Chen, Jiangsu (CN); Peng Li, Jiangsu (CN)

(73) Assignees: State Grid Jiangsu Electric Power Research Institute (CN); State Grid Corporation of China (CN)

( * ) Notice: Subject to any disclaimer, the term of this patent is extended or adjusted under 35 U.S.C. 154(b) by 0 days.

(21) Appl. No.: 15/739,722

(22) PCT Filed: Nov. 30, 2016

(86) PCT No.: PCT/CN2016/107963
§ 371 (c)(1),
(2) Date: Dec. 23, 2017

(87) PCT Pub. No.: WO2018/098672
PCT Pub. Date: Jun. 7, 2018

(65) Prior Publication Data
US 2018/0316190 A1    Nov. 1, 2018

(51) Int. Cl.
*H02J 3/18*   (2006.01)
*H02M 7/08*   (2006.01)
(Continued)

(52) U.S. Cl.
CPC ........... *H02J 3/1814* (2013.01); *H02J 3/36* (2013.01); *H02M 7/08* (2013.01); *H02M 7/48* (2013.01)

(58) Field of Classification Search
CPC .......... H02J 3/36; H02M 1/143; H02M 7/003; H02M 7/06; H02M 7/08; H02M 7/106; H02M 7/17
See application file for complete search history.

(56) References Cited

U.S. PATENT DOCUMENTS

| | | | | |
|---|---|---|---|---|
| 5,602,554 A | * | 2/1997 | Cepas | H01Q 1/248 342/368 |
| 5,734,256 A | * | 3/1998 | Larsen | H02H 3/023 323/207 |

(Continued)

FOREIGN PATENT DOCUMENTS

| CN | 202949227 U | 5/2013 |
|---|---|---|
| CN | 103986159 A | 8/2014 |

(Continued)

OTHER PUBLICATIONS

International Searching Authority, ISR, dated Aug. 28, 2017, PCT Application No. PCT/CN2016/107963.

*Primary Examiner* — Yusef A Ahmed

(57) ABSTRACT

The present invention discloses a novel Unified Power Flow Controller UPFC and its control method. Supposing that one end of DC converter is connected to the DC transmission line of HVDC converter station or substation and the other end is connected to the DC side of a series converter, the AC output voltage of the series converter can be controlled to regulate the line power of the UPFC for operation in UPFC and SSSC mode. In addition, when the number of transformers and shunt converters is decreased at the shunt side of the UPFC, the HVDC Converter Station can be used to provide active power for the series converter of UPFC, which can effectively reduce operation costs and ensure stable operation of power grid. Therefore, there is a bright application prospect for the invention.

16 Claims, 3 Drawing Sheets

(51) Int. Cl.
*H02J 3/36* (2006.01)
*H02M 7/48* (2007.01)

(56) References Cited

U.S. PATENT DOCUMENTS

| | | | | |
|---|---|---|---|---|
| 6,335,613 | B1* | 1/2002 | Sen | G05F 1/12 |
| | | | | 323/211 |
| 6,384,581 | B1* | 5/2002 | Sen | H02J 3/06 |
| | | | | 323/211 |
| 6,396,248 | B1* | 5/2002 | Sen | G05F 1/70 |
| | | | | 323/209 |
| 6,420,856 | B1* | 7/2002 | Sen | H02J 3/1878 |
| | | | | 323/209 |
| 2005/0015182 | A1* | 1/2005 | Bebic | H02J 3/1814 |
| | | | | 700/286 |
| 2005/0071050 | A1* | 3/2005 | Chow | G05F 1/70 |
| | | | | 700/286 |
| 2011/0089873 | A1* | 4/2011 | Blocher | H02M 7/483 |
| | | | | 318/400.3 |
| 2012/0112551 | A1* | 5/2012 | Li | H02J 3/386 |
| | | | | 307/82 |
| 2012/0267955 | A1* | 10/2012 | Zhan | H02J 1/06 |
| | | | | 307/31 |
| 2012/0300510 | A1* | 11/2012 | Jensen | H02J 3/36 |
| | | | | 363/35 |
| 2013/0200617 | A1* | 8/2013 | Smith | H02P 9/02 |
| | | | | 290/43 |
| 2013/0200846 | A1* | 8/2013 | Ang | B60L 11/1816 |
| | | | | 320/109 |
| 2013/0221921 | A1* | 8/2013 | Ang | B60L 11/1811 |
| | | | | 320/109 |
| 2015/0263526 | A1* | 9/2015 | Kjær | H02J 3/386 |
| | | | | 290/44 |
| 2015/0263569 | A1* | 9/2015 | Brogan | H02J 3/36 |
| | | | | 290/44 |
| 2016/0111917 | A1* | 4/2016 | Ghosh | H02J 9/062 |
| | | | | 307/66 |
| 2016/0322824 | A1* | 11/2016 | Park | H02J 3/36 |
| 2017/0098936 | A1* | 4/2017 | Tian | H02J 3/14 |
| 2017/0199502 | A1* | 7/2017 | Tian | H02J 3/24 |
| 2017/0214331 | A1* | 7/2017 | Choi | H02J 3/36 |

FOREIGN PATENT DOCUMENTS

| | | |
|---|---|---|
| CN | 104065063 A | 9/2014 |
| CN | 203850833 U | 9/2014 |
| CN | 105870927 A | 8/2016 |

* cited by examiner

UNIFIED POWER FLOW CONTROLLER AND CONTROL METHOD THEREOF

FIELD

The present invention belongs to AC transmission technology, especially relates to a novel Unified Power Flow Controller and its control method.

BACKGROUND

As a new-generation unit with the most powerful functions and advanced performance, the Unified Power Flow Controller (UPFC) is the most commonly used Flexible AC Transmission (FACTS) unit so far. Integrated with various flexible control methods of FACTS elements, the unit can realize voltage regulation, series compensation, phase shift and other functions respectively or simultaneously simply by changing control laws. In addition, the UPFC unit can effectively control the distribution of power flow on the control circuit, improving the stability of power system.

However, as the HVDC project continues to grow in China, the number of DC converter stations is skyrocketing in the existing power grid. When the number of transformers and shunt converter is decreased at the parallel side of the Unified Power Flow Controller the problem to be solved is how to utilize the AC side of HVDC converter station to provide active power for the Unified Power Flow Controller, reduce operation costs and ensure reliable operation of power grid.

SUMMARY

The present invention is to address the problem of how to reduce the number of transformers and shunt converters at the shunt side of the Unified Power Flow Controller with the existing technology. In the present invention, the Unified Power Flow Controller and its control method can operate in UPFC and SSSC mode. In addition, when the number of transformers and shunt converters is decreased at the shunt side of UPFC, the HVDC Converter Station is used to provide active power for the series converter of UPFC, which can effectively reduce operation costs and ensure stable operation of power grid. Therefore, there is a bright application prospect for the invention.

Therefore, the present invention has adopted the following technical schemes to achieve the aforesaid objectives:

Installed on the transmission line near the HVDC converter station, a novel Unified Power Flow Controller contains a series converter, a series transformer, a DC converter and a control circuit. Among them, one end of the DC converter is connected to the DC transmission line of HVDC converter station via the first DC switch block, the other end is connected to the DC side of series converter via the second DC switch block and the AC side is connected to the AC transmission line via a series transformer. Moreover, the active power consumed by the series converter during operation is supplied by a DC converter and reactive power by its internal capacitors.

The DC converter can also be directly connected to the control circuit via a series converter, with which the AC output voltage at the AC side of series converter can be controlled to regulate the line power of the UPFC.

The control circuit can also be connected to the first and second DC switch block respectively to control the status of each DC switch block.

The novel Unified Power Flow Controller described above is characterized in that: the first DC switch block includes a first DC switch and a second DC switch, the positive electrode at one side of DC converter is connected to the DC transmission line of the HVDC converter station via the first DC switch and the negative electrode at one side of DC converter is connected to the ground via the second DC switch.

The novel Unified Power Flow Controller described above is characterized in that: the second DC switch block includes a third DC switch and a fourth DC switch, the positive electrode at the other side of DC converter is connected to the positive electrode at the DC side of series converter via the third DC switch and the negative electrode at the other side of DC converter is connected to the negative electrode at the DC side of series converter via the fourth DC switch.

The novel Unified Power Flow Controller described above is characterized in that: a capacitor is connected in parallel to the third DC switch and the fourth DC switch.

The novel Unified Power Flow Controller described above is characterized in that: the DC transmission line of the HVDC converter station or substation is also connected to an inverter station.

The control method of the novel Unified Power Flow Controller described above is characterized in that the status of the first or second DC switch block can be controlled by the control circuit to operate the Unified Power Flow Controller in UPFC and SSSC mode in accordance with the following procedures:

Turn off the DC switches in the first and second DC switch block through the control circuit to operate the Unified Power Flow Controller in UPFC mode;

Turn off the DC switch in the first DC Mitch block and turn on the DC switch in the second DC switch block to operate the Unified Power Flow Controller in SSSC mode;

The control method of the novel Unified Power Flow Controller described above is characterized in that: the novel Unified Power Flow Controller can operate in UPFC mode in accordance with the following procedures.

(1) The active power consumed by the series converter during operation is supplied by a DC converter and reactive power by its internal capacitors;

(2) After the control circuit is used to control the AC output voltage (including amplitude and phase angle) at the AC side of a series converter, the series converter can output active and reactive power to regulate the active and reactive power on the transmission line of the novel Unified Power Flow Controller.

The control method of the novel Unified Power Flow Controller described above is characterized in that the novel Unified Power Flow Controller can operate in SSSC mode in accordance with the following procedures:

(1) The active power consumed by the series converter during operation is zero and the reactive power is supplied by its internal capacitors;

(2) After the control circuit is used to control the AC output voltage (including amplitude and phase angle) at the AC side of a series converter, the series converter can output reactive power to regulate the active power on the transmission line of the novel Unified Power Flow Controller.

Beneficial effect of the present invention the present invention discloses a novel Unified Power Flow Controller (UPFC) and its control method. Supposing that one end of DC converter is connected to the DC transmission line of HVDC converter station or substation and the other end is connected to the DC side of a series converter, the AC output voltage of the series converter can be controlled to regulate the line power of the UPFC for operation in UPFC and SSSC mode. In addition, when the number of transformers and shunt converters is decreased at the shunt side of the UPFC, the HVDC Converter Station can be used to provide active power for the series converter of UPFC, which can effectively reduce operation costs and ensure stable operation of power grid. Therefore, there is a bright application prospect for the invention.

DETAILED DESCRIPTION

The present invention will be further illustrated in accordance with the drawings of the instruction.

Figure 1:
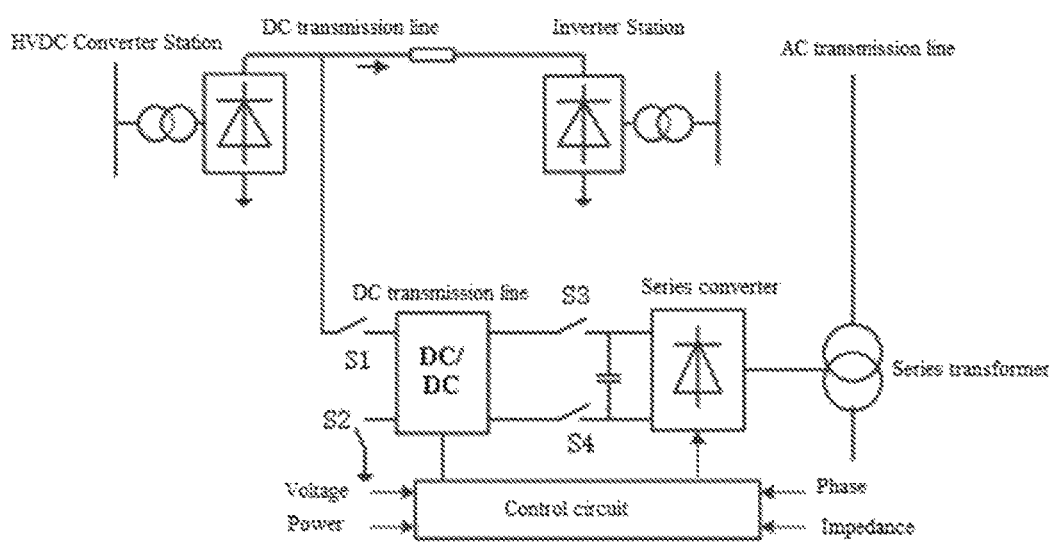
FIG. 1 is a system connection diagram of a novel Unified Power Flow Controller in the present invention.

As shown in FIG. 1, the Unified Power Flow Controller in the present invention is installed on the transmission line near the HVDC converter station, which can not only decrease the number of transformers and shunt converters at the shunt side, but also effectively reduce operation costs and ensure stable operation of power grid. In addition, the controller includes a series converter, a series transformer, a DC converter and a control circuit. Among them, one end of the DC converter is connected to the DC transmission line of HVDC converter station via a first DC switch block, the other end is connected to the DC side of the series converter via a second DC switch block and the AC side of the DC converter is connected to the AC transmission line via a series transformer.

Moreover, the active power consumed by the series converter during operation is supplied by a DC converter and the reactive power is supplied by its internal capacitors.

The DC converter can also be directly connected to the series converter via the control circuit, with which the AC output voltage at the AC side of the series converter can be controlled to regulate the line power of the UPFC.

The control circuit is also connected to a first DC switch and a second DC switch block respectively to control the status (ON/OFF) of the DC switch blocks. Except for controlling the status of the DC switch blocks, the control circuit is basically the same as the control circuit of the traditional Unified Power Flow Controller.

The first DC switch block includes a first DC switch S1 and a second DC switch S2, the positive electrode at one side of DC converter is connected to the DC transmission line of the HVDC converter station or substation via the first DC switch S1 and the negative electrode at one side of the DC converter is connected to the ground via the second DC switch S2.

The second DC switch block includes a third DC switch S3 and a fourth DC switch S4, the positive electrode at the other side of the DC converter is connected to the positive electrode at the DC side of the series converter via the third DC switch S3 and the negative electrode at the other side of the DC converter is connected to the negative electrode at the DC side of the series converter via the fourth DC switch S4.

A capacitor is connected in parallel to the third DC switch S3 and the fourth DC switch S4, providing active power for the series converter when maintaining constant DC voltage of the series converter.

The DC transmission line of the HVDC converter station or substation is also connected to an inverter station with no impact on the normal operation of the HVDC converter station itself.

Figure 2:
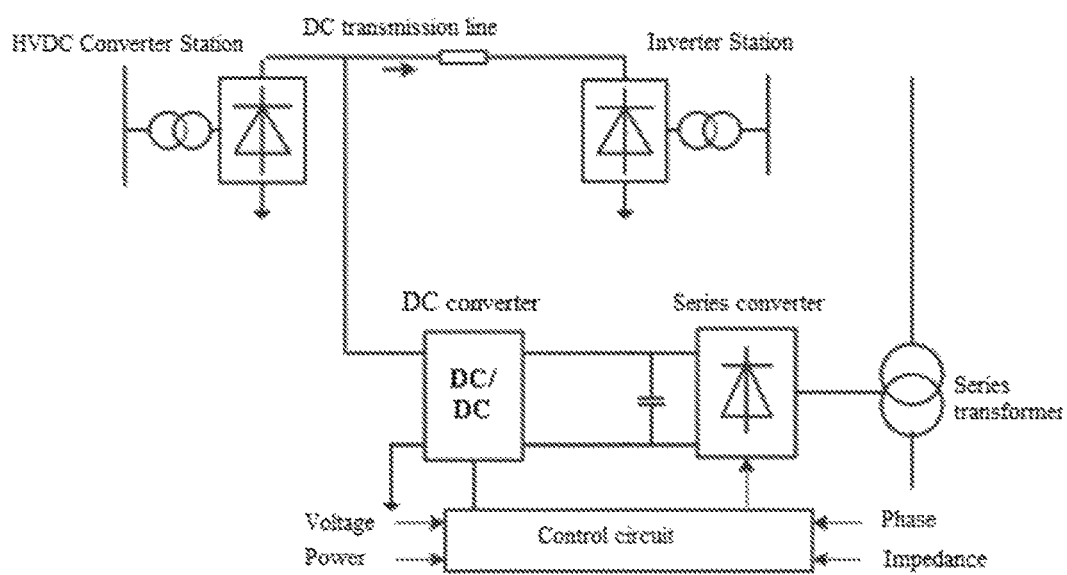
FIG. 2 is a system connection diagram of the Unified Power Flow Controller in UPFC mode in the present invention.

The control method of the novel Unified Power Flow Controller based on the present invention is characterized in that: the control circuit can be used to control the status of the first or second DC switch block to operate the Unified Power Flow Controller in UPFC (Unified Power Flow Controller) and SSSC (Static Synchronous Series Compensator) mode in accordance with the following procedures:

As shown in FIG. 2, turn off the DC switches in the first and second DC switch block through the control circuit to operate the Unified Power Flow Controller in UPFC mode in accordance with the following procedures:

(1) The active power consumed by the series converter during operation is supplied by a DC converter and reactive power by its internal capacitors;

(2) After the control circuit is used to control the AC output voltage (including its amplitude and phase angle) at the AC side of a series converter, the series converter can output active and reactive power to regulate the active and reactive power on the transmission line of the novel Unified Power Flow Controller.

Figure 3:
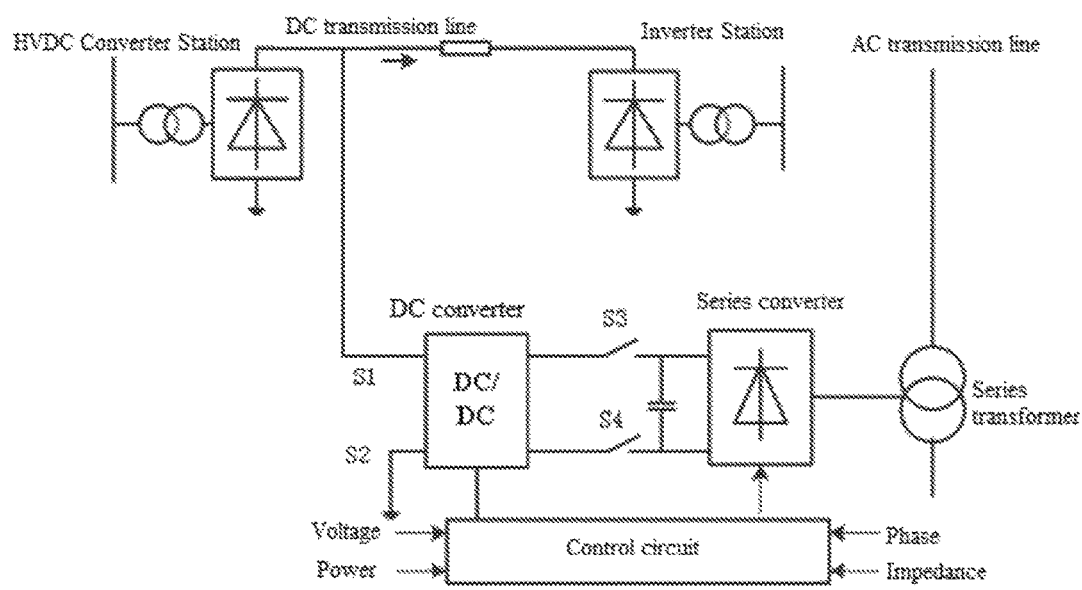
FIG. 3 is a system connection diagram of the Unified Power Flow Controller in SSSC mode in the present invention.

As shown in FIG. 3, turn off the DC switch in the first DC switch block and turn on the DC switch in the second DC switch block to operate the Unified Power Flow Controller in SSSC mode in accordance with the following procedures:

(1) The active power consumed by the series converter during operation is zero and the reactive power is supplied by its internal capacitors;

(2) After the control circuit is used to control the AC output voltage (including its amplitude and phase angle) at the AC side of a series converter, the series converter can output reactive power to regulate the active power on the transmission line of the novel Unified Power Flow Controller.

In conclusion, the present invention discloses a novel Unified Power Flow Controller (UPFC) and its control method. Supposing that one end of DC converter is connected to the DC transmission line of HVDC converter station or substation and the other end is connected to the DC side of a series converter, the AC output voltage of the series converter can be controlled to regulate the line power of the UPFC for operation in UPFC and SSSC mode. In addition, when the number of transformers and shunt converters is decreased at the shunt side of the UPFC, the HVDC Converter Station can be used to provide active power for the series converter of UPFC, which can effectively reduce operation costs and ensure stable operation of power grid. Therefore, there is a bright application prospect for the invention.

The above contents have described the basic principles, main features and advantages of the present invention. The technical personnel in this industry must be informed that the present invention shall not be subject to the above embodiments. What is described in the above embodiments and instruction is only to illustrate the principle of the present invention. Without departing from the spirit and scope of the present invention, various modifications and alterations of the present invention will be included in the scope of protection required by the present invention, which shall be subject to the attached claims and its equivalents.

What is claimed is:

1. A unified power flow controller, which is configured on a transmission line near an HVDC converter station, comprising:
a series converter, a series transformer, a DC converter and a control circuit, wherein
one end of the DC converter is connected to a DC transmission line of the HVDC converter station via first DC switch block, the other end of the DC converter is connected to a DC side of the series converter via second DC switch block, an AC side of the series converter is connected to an AC transmission line via the series transformer, an active power consumed by the series converter during operation is supplied by the DC converter and a reactive power consumed by the series converter during operation is supplied by its internal capacitors;
the DC converter is directly connected to the series converter via the control circuit, an AC output voltage at the AC side of the series converter is controlled by the control circuit to regulate a line power of the unified power flow controller;
the control circuit is connected to the first and second DC switch block respectively to control ON/OFF of each of the first and second DC switch blocks,
the control circuit configured to operate the unified power flow controller in a unified power flow controller (UPFC) mode, wherein
the active power consumed by the series converter during operation is supplied by the DC converter, and the reactive power consumed by the series converter during operation is supplied by its internal capacitors;
the control circuit is configured to control the AC output voltage, including amplitude and phase angle, at the AC side of the series converter; and
the series converter is configured to output the active and reactive power to regulate the active and reactive power on the transmission line of the unified power flow controller.

2. The unified power flow controller according to claim 1, wherein,
the first DC switch block includes a first DC switch and a second DC switch,
a positive electrode at one side of the DC converter is connected to the DC transmission line of the HVDC converter station via the first DC switch, and a negative electrode at the one side of the DC converter is connected to ground via the second DC switch.

3. The unified power flow controller according to claim 1, wherein,
the second DC switch block includes a third DC switch and a fourth DC switch,
a positive electrode at the other side of the DC converter is connected to a positive electrode at the DC side of the series converter via the third DC switch, and a negative electrode at the other side of the DC converter is connected to a negative electrode at the DC side of the series converter via the fourth DC switch.

4. The unified power flow controller according to claim 1, wherein,
the DC transmission line of the HVDC converter station or substation is further connected to an inverter station.

5. A unified power flow controller, which is configured on a transmission line near an HVDC converter station, comprising:
a series converter, a series transformer, a DC converter and a control circuit, wherein
one end of the DC converter is connected to a DC transmission line of the HVDC converter station via first DC switch block, the other end of the DC converter is connected to a DC side of the series converter via second DC switch block, an AC side of the series converter is connected to an AC transmission line via the series transformer, an active power consumed by the series converter during operation is supplied by the DC converter and a reactive power consumed by the series converter during operation is supplied by its internal capacitors;
the DC converter is directly connected to the series converter via the control circuit, an AC output voltage at the AC side of the series converter is controlled by the control circuit to regulate a line power of the unified power flow controller;
the control circuit is connected to the first and second DC switch block respectively to control ON/OFF of each of the first and second DC switch blocks,
the control circuit configured to operate the unified power flow controller in a static synchronous series compensator (SSSC) mode, wherein
the active power consumed by the series converter during operation is zero and the reactive power consumed by the series converter during operation is supplied by its internal capacitors;
the control circuit is configured to control the AC output voltage, including amplitude and phase angle, at the AC side of the series converter; and
the series converter is configured to output the reactive power to regulate the active power on the transmission line of the unified power flow controller.

6. The unified power flow controller according to claim 5, wherein,
the first DC switch block includes a first DC switch and a second DC switch,
a positive electrode at one side of the DC converter is connected to the DC transmission line of the HVDC converter station via the first DC switch, and a negative electrode at the one side of the DC converter is connected to ground via the second DC switch.

7. The unified power flow controller according to claim 5, wherein,
the second DC switch block includes a third DC switch and a fourth DC switch,
a positive electrode at the other side of the DC converter is connected to a positive electrode at the DC side of the series converter via the third DC switch, and a negative electrode at the other side of the DC converter is connected to a negative electrode at the DC side of the series converter via the fourth DC switch.

8. The unified power flow controller according to claim 5, wherein,
the DC transmission line of the HVDC converter station or substation is further connected to an inverter station.

9. A control method for a unified power flow controller, which is configured on a transmission line near an HVDC converter station, wherein
the unified power flow controller comprises:
a series converter, a series transformer, a DC converter and a control circuit, wherein
one end of the DC converter is connected to a DC transmission line of the HVDC converter station via first DC switch block, the other end of the DC converter is connected to a DC side of the series converter via second DC switch block, an AC side of the series converter is connected to an AC transmission line via the series transformer, an active power consumed by the series converter during operation is supplied by the DC converter and a reactive power consumed by the series converter during operation is supplied by its internal capacitors;

the DC converter is directly connected to the series converter via the control circuit, an AC output voltage at the AC side of the series converter is controlled by the control circuit to regulate a line power of the unified power flow controller;

the control circuit is connected to the first and second DC switch block respectively to control ON/OFF of each of the first and second DC switch blocks, the method comprises the following steps:

controlling ON/OFF of the first or the second DC switch block by the control circuit to operate the unified power flow controller in unified power flow controller (UPFC) and static synchronous series compensator (SSSC) modes, wherein DC switches in each of the first and second DC switch blocks are switched off by the control circuit to operate the unified power flow controller in the UPFC mode, the DC switches in the first DC switch block are switched off and the DC switches in the second DC switch block are switched on to operate the unified power flow controller in the SSSC mode, the unified power flow controller operates in the UPFC mode in accordance with the following procedures:

the active power consumed by the series converter during operation is supplied by the DC converter, and the reactive power consumed by the series converter during operation is supplied by its internal capacitors;

the control circuit is used to control the AC output voltage, including amplitude and phase angle, at the AC side of the series converter; and the series converter outputs the active and reactive power to regulate the active and reactive power on the transmission line of the unified power flow controller.

10. The control method according to claim 9, wherein, the switches in the first DC switch block includes a first DC switch and a second DC switch, a positive electrode at one side of the DC converter is connected to the DC transmission line of the HVDC converter station via the first DC switch, and a negative electrode at the one side of the DC converter is connected to ground via the second DC switch.

11. The control method according to claim 9, wherein, the switches in the second DC switch block includes a third DC switch and a fourth DC switch, a positive electrode at the other side of the DC converter is connected to a positive electrode at the DC side of the series converter via the third DC switch, and a negative electrode at the other side of the DC converter is connected to a negative electrode at the DC side of the series converter via the fourth DC switch.

12. The control method according to claim 9, wherein, the DC transmission line of the HVDC converter station or substation is further connected to an inverter station.

13. A control method for a unified power flow controller, which is configured on a transmission line near an HVDC converter station, wherein the unified power flow controller comprises:

a series converter, a series transformer, a DC converter and a control circuit, wherein one end of the DC converter is connected to a DC transmission line of the HVDC converter station via first DC switch block, the other end of the DC converter is connected to a DC side of the series converter via second DC switch block, an AC side of the series converter is connected to an AC transmission line via the series transformer, an active power consumed by the series converter during operation is supplied by the DC converter and a reactive power consumed by the series converter during operation is supplied by its internal capacitors;

the DC converter is directly connected to the series converter via the control circuit, an AC output voltage at the AC side of the series converter is controlled by the control circuit to regulate a line power of the unified power flow controller;

the control circuit is connected to the first and second DC switch block respectively to control ON/OFF of each of the first and second DC switch blocks, the method comprises the following steps:

controlling ON/OFF of the first or the second DC switch block by the control circuit to operate the unified power flow controller in unified power flow controller (UPFC) and static synchronous series compensator (SSSC) modes, wherein DC switches in each of the first and second DC switch blocks are switched off by the control circuit to operate the unified power flow controller in the UPFC mode, the DC switches in the first DC switch block are switched off and the DC switches in the second DC switch block are switched on to operate the unified power flow controller in the SSSC mode, the unified power flow controller operates in the SSSC mode in accordance with the following procedures:

the active power consumed by the series converter during operation is zero and the reactive power consumed by the series converter during operation is supplied by its internal capacitors;

the control circuit is used to control the AC output voltage, including amplitude and phase angle, at the AC side of the series converter; and the series converter outputs the reactive power to regulate the active power on the transmission line of the unified power flow controller.

14. The control method according to claim 13, wherein, the switches in the first DC switch block includes a first DC switch and a second DC switch, a positive electrode at one side of the DC converter is connected to the DC transmission line of the HVDC converter station via the first DC switch, and a negative electrode at the one side of the DC converter is connected to ground via the second DC switch.

15. The control method according to claim 13, wherein, the switches in the second DC switch block includes a third DC switch and a fourth DC switch, a positive electrode at the other side of the DC converter is connected to a positive electrode at the DC side of the series converter via the third DC switch, and a negative electrode at the other side of the DC converter is connected to a negative electrode at the DC side of the series converter via the fourth DC switch.

16. The control method according to claim 13, wherein, the DC transmission line of the HVDC converter station or substation is further connected to an inverter station.

* * * * *